United States Patent [19]
Bartoschek et al.

[11] Patent Number: 5,178,365
[45] Date of Patent: Jan. 12, 1993

[54] SHUT OFF OR CONTROL VALVE

[75] Inventors: Manfred Bartoschek, Frankenthal, Fed. Rep. of Germany; Primo Lovisetto, Vicenza, Italy

[73] Assignee: KSB Aktiengesellschaft, Frankenthal/Pfalz, Fed. Rep. of Germany

[21] Appl. No.: 730,866
[22] PCT Filed: Jan. 9, 1990
[86] PCT No.: PCT/EP90/00040
§ 371 Date: Aug. 29, 1991
§ 102(e) Date: Aug. 29, 1991
[87] PCT Pub. No.: WO90/08274
PCT Pub. Date: Jul. 26, 1990

[30] Foreign Application Priority Data

Jan. 21, 1989 [DE] Fed. Rep. of Germany ....... 3901700

[51] Int. Cl.$^5$ .......................... F16K 3/316; F16K 1/08
[52] U.S. Cl. .................... 251/318; 251/335.3; 251/326
[58] Field of Search ............. 251/318, 319, 326, 335.3

[56]  References Cited

U.S. PATENT DOCUMENTS 2,504,057  4/1950  Trefil ................................. 251/318
3,488,034  1/1970  Masheder ...................... 251/326 X

FOREIGN PATENT DOCUMENTS 546464    3/1932  Fed. Rep. of Germany .
1959547   1/1971  Fed. Rep. of Germany .
2047668   3/1972  Fed. Rep. of Germany .
606208    6/1928  France .
197056    7/1938  Switzerland .
499548    1/1939  United Kingdom ................ 251/327

Primary Examiner—Arnold Rosenthal
Attorney, Agent, or Firm—Peter K. Kontler

[57]  ABSTRACT

A gate valve has a housing, a valving element in the housing, and a seat in the housing which cooperates with the valving element and extends transverse to the flow direction. The valving element is carried by a spindle which serves to move the valving element into and out of engagement with the seat. A support for the spindle is disposed in the housing and has a central, outwardly directed flange which defines a passage for the spindle. The flange is coupled to the spindle in the region of the valving element so that the support moves with the spindle. The support is in sliding engagement with the internal surface of the housing to thus guide the spindle and support the latter against transverse forces generated by flow through the housing.

15 Claims, 4 Drawing Sheets

SHUT OFF OR CONTROL VALVE

BACKGROUND OF THE INVENTION

The invention relates to a shutoff or control.

In valves where forces act on the spindle transverse to the spindle axis, the spindle must be supported in the housing. The danger of unacceptably large transverse forces arises primarily in valves where the displacement during actuation is large. Gate valves, in particular, are to be mentioned here. Support is achieved by means of ribs or grooves on or in the housing, or by means of special abutments which surround the spindle and are in contact with the housing wall.

FIG. 3 of the German patent 1 959 547 shows a valve which is equipped with an abutment of sheet metal. The abutment has an outwardly directed flange which surrounds the spindle, and the spindle can slide up-and-down in the outwardly directed flange. The abutment is provided with a circumferentially extending collar which bears against the housing wall where it is secured in a manner not indicated in detail.

To the extent that they are arranged near the valve seat, supports or abutments which are fixed relative to the housing allow only a relatively short stroke of the spindle. Accordingly, they cannot be used for gate valves and valves with a stroke of similar length. On the other hand, if the support is disposed at a location farther away from the valve seat in such a manner as to permit the full opening stroke of the closure or control element, its supporting function is necessarily limited. Due to the large spacing from the support, the transverse forces which are generated by the flow and act on the closure or control element can, in an extreme case, lead to such great deflection of the closure or control element that its function is no longer assured.

SUMMARY OF THE INVENTION

It is an object of the invention to provide a shutoff or control valve whose closure or control element is reliably supported against transverse forces even during a long stroke.

For an abutment disposed in the housing and supporting the spindle, the object set forth is achieved in that the abutment is connected with the spindle in the vicinity of the closure or control element and has an outer surface slidably guided at the housing wall surrounding the outer surface. The seat formed in the valve housing for the closure or control element is arranged transverse to the flow direction so that the abutment supports the spindle against the transverse forces generated by the flow.

The abutment, which is located in the vicinity of the closure or control element over the entire range of the stroke, reduces the bending moment on the spindle to a minimum regardless of the flow direction. Accordingly, an adjustment of the spindle diameter to a long stroke taking into consideration the bending forces is unnecessary.

BRIEF DESCRIPTION OF THE DRAWINGS

The invention is described in greater detail with reference to the accompanying drawings wherein.

DESCRIPTION OF THE PREFERRED EMBODIMENTS

Figure 1:
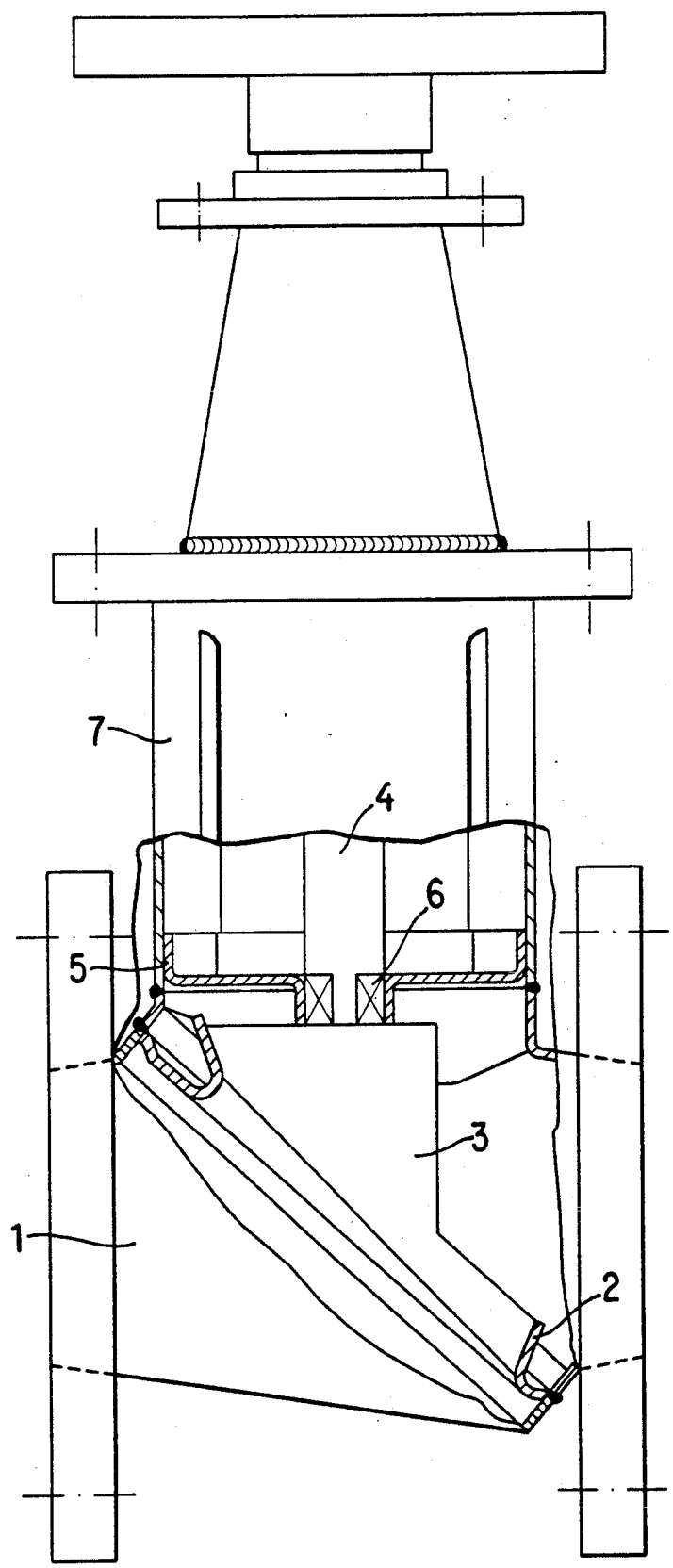
FIG. 1 is a partly sectional view of a shutoff valve having an abutment which supports the spindle.

The gate valve illustrated in FIG. 1 has a housing 1 which is assembled from a number of sheet metal components by weld seams and screw joints. A seating ring 2 is connected to the housing 1 by welding and cooperates with a closure element 3. The closure element 3 is secured to a non-rotary spindle 4 which is movable up-and-down. An abutment or support 5 serves to support the spindle 4 and is connected with the spindle 4 via a square coupling element 6 so as to be fixed against rotation. Upon movement of the spindle 4, the abutment 5 slides up or down in a housing neck 7.

Figure 2:
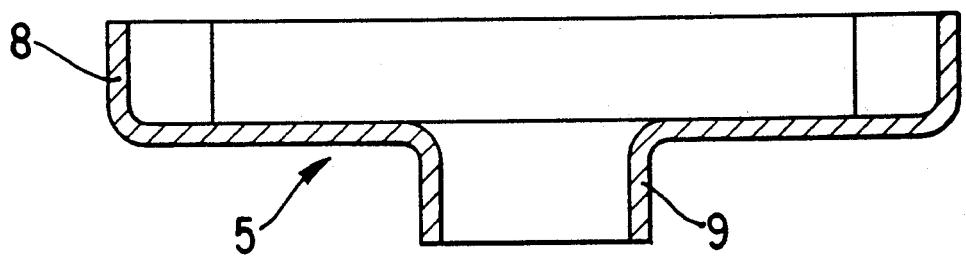
FIG. 2 is an enlarged detail view of the abutment of FIG. 1.

As can be seen particularly clearly from FIG. 2, the transverse abutment 5 has an outer surface 8 which slides on the wall of the housing neck. The outwardly directed flange 9 of the abutment 5 serving to establish the connection with the square coupling element extends in the direction opposite to the outer surface 8. This design, which is to be preferred because of optimum space utilization, can be modified, however. Thus, the outwardly directed flange 9 could be directed upwards; the middle portion of the abutment 5 connecting the outer surface 8 and the outwardly directed flange 9 with one another can be funnel-shaped.

Figure 3:
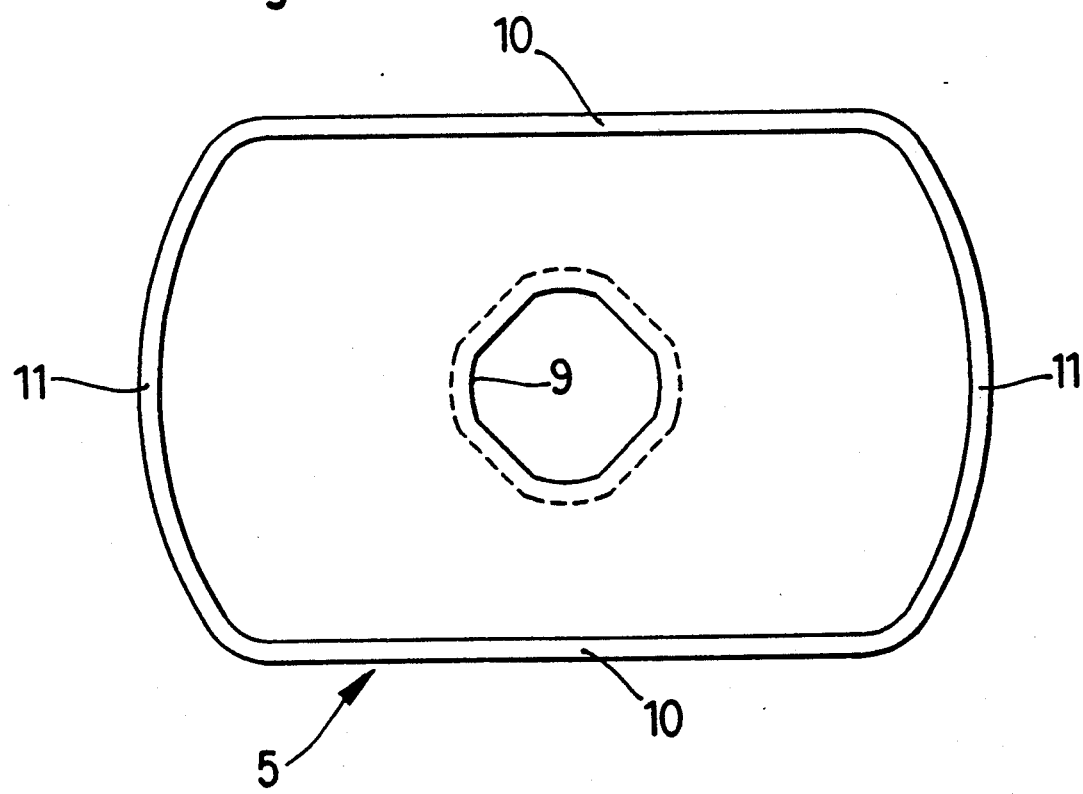
FIG. 3 is a plan view of the abutment of FIG. 2.

The design features of the abutment 5 which operate to prevent rotation of the spindle 4 and the closure element 3 are observable in FIG. 3. Aside from the square, outwardly directed flange 9 already mentioned, two parallel walls 10 of the outer surface 8 are to be noted here. Each of the walls 10 remains in contact with two mutually perpendicular corrugations in the housing neck 7 during the entire stroke. Two rounded, sliding surfaces 11 complete the outer surface 8 of the abutment 5.

Figure 4:
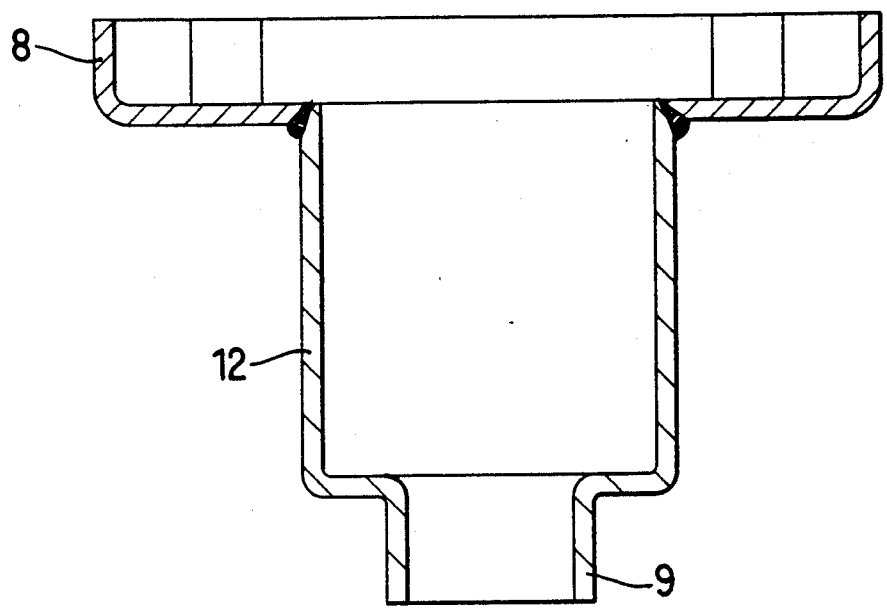
FIG. 4 shows another embodiment of the abutment.
Figure 5:
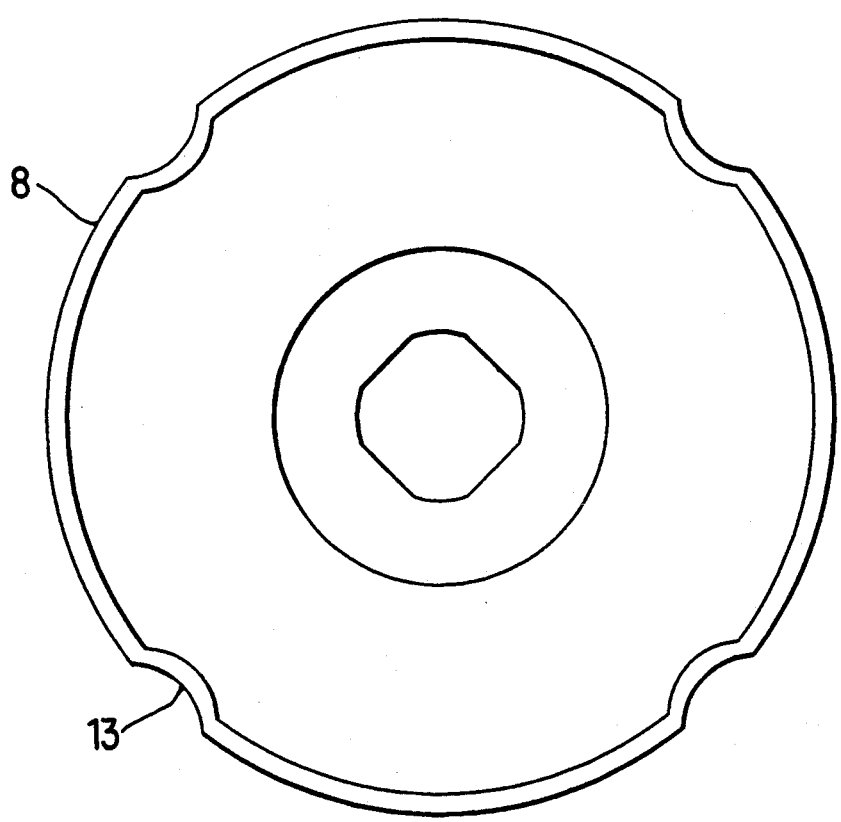
FIG. 5 is a plan view of the abutment of FIG. 4.

In the variation of the abutment illustrated in FIGS. 4 and 5, a tubular transition element 12 constitutes the connection between the outwardly directed flange 9 and the component which carries the outer surface 8. Guidance with security against rotation is here achieved by means of four corrugations 13 which are arranged in a circular outer surface 8 and cooperate with corresponding corrugations in the housing neck 7.

Figure 6:
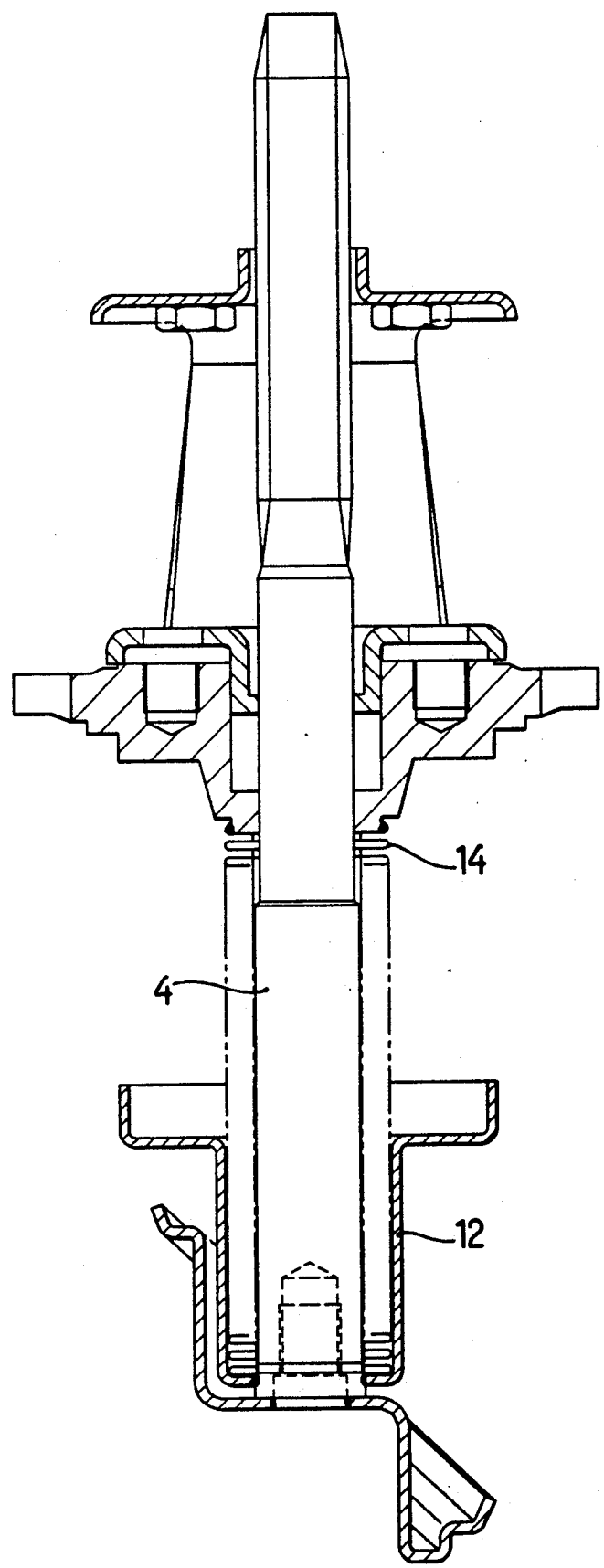
FIG. 6 is a sectional view of a further valve having an abutment which supports the spindle.

FIG. 6 shows a valve in which a tubular transition element 12 of an abutment receives a bellows 14.

We claim:

1. A valve, comprising a housing having an internal surface; a valving element in said housing; a seat in said housing; an actuating element arranged to move said valving element into and out of engagement with said seat; and a support for supporting said actuating element against transverse forces generated by flow of a fluid through said housing, said support being mounted on said actuating element and being in sliding contact with said internal surface, and said valving element being mounted on said actuating element separately from said support.

2. The valve of claim 1, wherein said support is mounted on said actuating element in the region of said valving element.

3. The valve of claim 1, wherein said seat extends transverse to the direction of flow through said housing.

4. The valve of claim 1, wherein said support circumscribes said actuating element.

5. The valve of claim 4, wherein said support is provided with an outwardly extending flange and said flange circumscribes said actuating element.

6. The valve of claim 1, wherein said support is fixed against rotation relative to said actuating element.

7. The valve of claim 6, wherein said support and said internal surface have complementary shapes which inhibit rotation of said support.

8. The valve of claim 1, wherein said actuating element and said support have complementary coupling portions.

9. The valve of claim 1, wherein said support has a coupling portion for establishing a connection with said actuating element, and a guiding portion which engages said internal surface, said coupling portion and said guiding portion extending outwardly from said support in opposite directions.

10. The valve of claim 1, wherein at least a portion of said internal surface and at least a portion of said support are non-circular.

11. The valve of claim 1, wherein said internal surface is substantially circumferentially complete and said support has a substantially circumferentially complete external surface, said internal and external surfaces cooperating with one another substantially in their entireties.

12. The valve of claim 11, wherein said support is fixed against rotation relative to said actuating element, said internal and external surfaces having complementary shapes which inhibit rotation of said support.

13. The valve of claim 11, wherein said actuating element is translatable in said housing and said support is coupled to said actuating element for translation therewith.

14. A valve, comprising a housing having an internal surface; a valving element in said housing; a seat in said housing; an actuating element connected to said valving element and being arranged to move said valving element into and out of engagement with said seat; and a support for supporting said actuating element against transverse forces generated by flow of a fluid through said housing, said support being coupled to said actuating element for movement therewith and being in sliding contact with said internal surface, and said support having a coupling portion for establishing a connection with said actuating element, a guiding portion which engages said internal surface, and a tubular portion intermediate said coupling portion and said guiding portion.

15. The valve of claim 14, further comprising a bellows-like element inside said tubular portion.

* * * * *